United States Patent
Otake

(10) Patent No.: US 9,234,099 B2
(45) Date of Patent: Jan. 12, 2016

(54) STIMULUS-RESPONSIVE COMPOUND, DEFORMABLE MATERIAL, AND ACTUATOR

(71) Applicant: SEIKO EPSON CORPORATION, Tokyo (JP)

(72) Inventor: Toshihiro Otake, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/419,727

(22) PCT Filed: Aug. 8, 2013

(86) PCT No.: PCT/JP2013/004791
§ 371 (c)(1),
(2) Date: Feb. 5, 2015

(87) PCT Pub. No.: WO2014/024497
PCT Pub. Date: Feb. 13, 2014

(65) Prior Publication Data
US 2015/0191596 A1    Jul. 9, 2015

(30) Foreign Application Priority Data

Aug. 9, 2012  (JP) ................................. 2012-177329

(51) Int. Cl.

| | | |
|---|---|---|
| *C08L 83/04* | (2006.01) | |
| *C08K 3/04* | (2006.01) | |
| *C08G 77/48* | (2006.01) | |
| *C08K 7/24* | (2006.01) | |
| *C08G 77/28* | (2006.01) | |
| *C08G 77/00* | (2006.01) | |
| *H01B 1/24* | (2006.01) | |
| *C08C 19/10* | (2006.01) | |
| *C08J 7/12* | (2006.01) | |

(52) U.S. Cl.
CPC ................. *C08L 83/04* (2013.01); *C08G 77/28* (2013.01); *C08G 77/48* (2013.01); *C08G 77/80* (2013.01); *C08K 3/04* (2013.01); *C08K 7/24* (2013.01); *H01B 1/24* (2013.01); *C08C 19/10* (2013.01); *C08J 7/12* (2013.01)

(58) Field of Classification Search
None
See application file for complete search history.

(56) References Cited

U.S. PATENT DOCUMENTS

| | | | |
|---|---|---|---|
| 7,122,229 B1 * | 10/2006 | Camacho-Lopez et al. ... | 428/1.1 |
| 8,436,117 B2 | 5/2013 | Otake | |

FOREIGN PATENT DOCUMENTS

| | | | |
|---|---|---|---|
| JP | 2005-224027 A | | 8/2005 |
| JP | 2010017066 | * | 1/2010 |
| JP | 2011-162447 A | | 8/2011 |
| JP | 2012-058363 | * | 3/2012 |
| JP | 2014-034658 A | | 2/2014 |

OTHER PUBLICATIONS

Abstract for the presentation entitled "Light-induced Disorder in Liquid Crystalline Elastomers for Actuation" authored by Sanchez-Ferrer and published in the Proceedings of SPIE (2011), 8107 (Nano-Optical-Mechanical Systems), 810702/1-810702/8.*
Abstract for the presentation entitled "Electro-opto-mechanical Effects in Swollen Polydomain Side Chain Liquid Crystal Elastomers" authored by Yusef et al. and published in AIP Conference Proceedings (2012), 1454 (International Conference on Physics and its Applications, 2011) 290-293.*
Machine translation for JP 2012-058363 (Mar. 2012).*
Abstract for JP 2010/017066 (Jan. 2010).*
Oct. 29, 2013 Search Report issued in International Application No. PCT/JP2013/004791.

* cited by examiner

*Primary Examiner* — Marc Zimmer
(74) *Attorney, Agent, or Firm* — Oliff PLC

(57) ABSTRACT

A stimulus-responsive compound includes a pair of polysiloxane chains, a cross-linking moiety which cross-links the polysiloxane chains, and a liquid crystal moiety which is bonded to the polysiloxane chain. The cross-linking moiety includes a unit A which has a bond functioning as a rotation axis, and also has first and second groups located at different ends of the bond, a first unit B which is disposed at a first bonding site of the first group, a second unit B which is disposed at a first bonding site of the second group, a first unit C, and a second unit C. The first unit C and one of the polysiloxane chains are bonded to each other. The second unit C and the other of the polysiloxane chains are bonded to each other. The first unit B and the second unit B are bonded to each other by a reduction reaction.

11 Claims, 3 Drawing Sheets

STIMULUS-RESPONSIVE COMPOUND, DEFORMABLE MATERIAL, AND ACTUATOR

This application claims a priority to Japanese Patent Application No. 2012-177329 filed on Aug. 9, 2012 which is hereby expressly incorporated by reference in its entirety.

TECHNICAL FIELD

The present invention relates to a stimulus-responsive compound, a deformable material, and an actuator.

BACKGROUND ART

Recently, in the medical field, micromachining field, etc., the necessity of compact actuators grows.

Such compact actuators are required to be small and also be driven at a low voltage. Various attempts have been made to realize such actuators driven at a low voltage (see, for example, PTL 1).

However, in the actuators in the related art, the driving voltage could not be sufficiently decreased, and a high voltage was required for deforming the actuators. Further, in the actuators in the related art, it was difficult to obtain a sufficiently large deformation amount (displacement amount).

CITATION LIST

Patent Literature

[PTL 1] JP-A-2005-224027

SUMMARY OF INVENTION

Technical Problem

An object of the invention is to provide a stimulus-responsive compound and a deformable material, each of which can be largely displaced at a low voltage, and an actuator using the same.

Solution to Problem

The above object is achieved by the following invention.

A stimulus-responsive compound of the invention includes:
a pair of polysiloxane chains;
a cross-linking moiety which cross-links the pair of polysiloxane chains; and
a liquid crystal moiety which is bonded to at least one of the pair of polysiloxane chains and includes a functional group having liquid crystallinity, wherein
the cross-linking moiety includes:
a unit A which has a bond functioning as a rotation axis, and also has a first group located at one end of the bond and a second group located at the other end of the bond;
a first unit B which is disposed at a first bonding site of the first group;
a second unit B which is disposed at a first bonding site of the second group;
a first unit C; and
a second unit C, and
the first unit C and one of the pair of polysiloxane chains are bonded to each other,
the second unit C and the other of the pair of polysiloxane chains are bonded to each other, and
the first unit B and the second unit B are bonded to each other by a reduction reaction.

According to this, the stimulus-responsive compound can be deformed (displaced) at a low electric power. Further, by bonding the polysiloxane chain to each unit, the degree of displacement can be relatively increased. Further, the stimulus-responsive compound has a liquid crystal moiety which is bonded to the polysiloxane chain, and this liquid crystal moiety exhibits a given orientation by using a technique for orienting liquid crystals, and therefore, the stimulus-responsive compound has a given directionality with respect to the driving. Further, the stimulus-responsive compound can have particularly excellent flexibility and moldability at normal temperature. Further, because of having polysiloxane chains, the glass transition point can be relatively decreased so that excellent responsiveness at a low temperature can be achieved. Further, the change in the conformation of the stimulus-responsive compound according to an oxidation-reduction reaction is reversible, and displacement from a contracted state to an extended (expanded) state and displacement from an extended (expanded) state to a contracted state can be repeated, and therefore, the stimulus-responsive compound has also excellent reproducibility.

It is preferred that in the stimulus-responsive compound of the invention, the unit A is one group selected from the group consisting of the following formula (1), the following formula (2), and the following formula (3).

[Chem. 1]

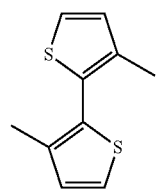

(1)

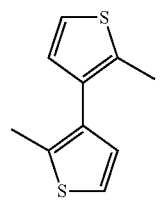

(2)

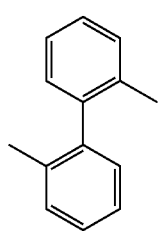

(3)

According to this, the stimulus-responsive compound can be deformed (displaced) more smoothly, and therefore is driven at a lower voltage.

It is preferred that in the stimulus-responsive compound of the invention, the first unit B and the second unit B are each a group represented by the following formula (4).

[Chem. 2]

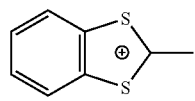

(4)

According to this, by adjusting the reaction conditions, the state of bonding between the units B can be reversibly and easily switched from the bonding state (a reduction reaction) to the non-bonding state (an oxidation reaction). Further, due to high reactivity, the stimulus-responsive compound can be deformed more smoothly at a low voltage.

It is preferred that in the stimulus-responsive compound of the invention, the first unit C and the second unit C each have an alkylene group having 4 or more and 10 or less carbon atoms.

According to this, the stimulus-responsive compound can be favorably deformed at a lower voltage, and also the flexibility of the stimulus-responsive compound (and a deformable material using the same) can be further enhanced.

It is preferred that in the stimulus-responsive compound of the invention, the functional group having liquid crystallinity has a plurality of ring structures, and one or more halogen atoms are bonded to one of the plurality of ring structures.

According to this, the motion performance when the functional groups having liquid crystallinity are oriented can be further enhanced, and thus, the speed of transition to the oriented state is further increased. As a result, the stimulus-responsive compound can be deformed (displaced) more rapidly and smoothly, and thus can be driven at a lower voltage.

A deformable material of the invention includes the stimulus-responsive compound of the invention.

According to this, the deformable material can be deformed (displaced) at a low electric power, and also the degree of displacement (deformation) is increased. Further, particularly excellent flexibility and moldability at normal temperature are achieved. Further, excellent responsiveness at a low temperature is also achieved. Further, by stopping the application of a voltage, the shape of the deformable material can be maintained. Therefore, such a deformable material can be favorably used for producing an excellent actuator.

It is preferred that in the deformable material of the invention, an electronically conductive substance is contained.

According to this, the degree of displacement (deformation) can be further increased. In addition, the deformable material can be deformed (displaced) at a lower electric power.

It is preferred that in the deformable material of the invention, the electronically conductive substance contains a carbon material.

According to this, a higher electronic conductivity can be imparted to the whole deformable material.

It is preferred that in the deformable material of the invention, the electronically conductive substance is in the form of a particle.

According to this, the electronically conductive substance can be dispersed uniformly in the whole deformable material, and therefore, the whole deformable material can be largely displaced uniformly at a relatively low voltage.

It is preferred that in the deformable material of the invention, the electronically conductive substance has an average particle diameter of 1 nm or more and 10 μm or less.

According to this, by providing a necessary concentration of the electronically conductive material to the whole deformable material, supply of electrons can be reliably achieved in the deformable material. Further, the efficiency of supplying electrons to the stimulus-responsive compound can be particularly enhanced, and therefore, a larger displacement force and displacement amount can be obtained.

An actuator of the invention is produced by using the deformable material of the invention.

According to this, an actuator which can be largely displaced at a low voltage and has excellent responsiveness at a low temperature can be provided.

DESCRIPTION OF EMBODIMENTS

Hereinafter, preferred embodiments of the invention will be described in detail.

First Embodiment of Stimulus-Responsive Compound

First, a first embodiment of the stimulus-responsive compound of the invention will be described in detail.

Figure 1A:
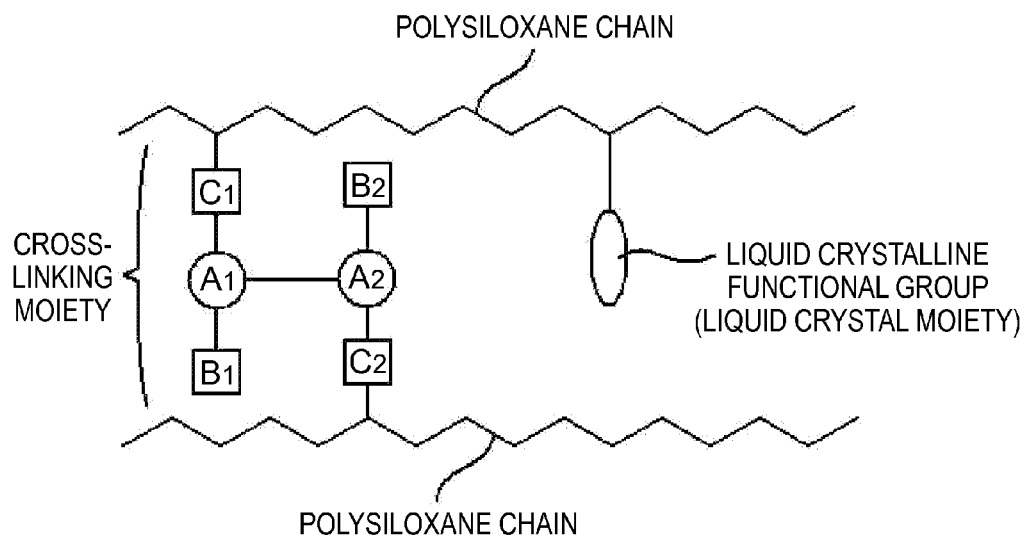
FIG. 1 shows views for illustrating the molecular structures of a stimulus-responsive compound according to a first embodiment before and after an oxidation-reduction reaction.
Figure 1B:
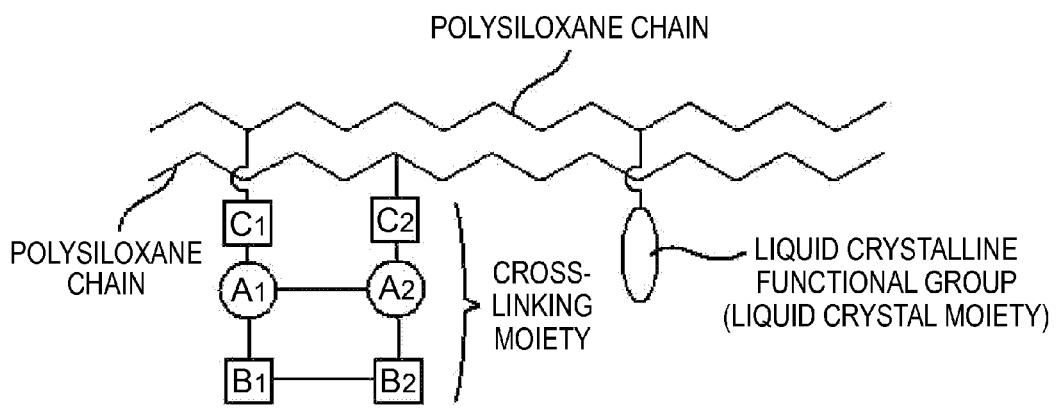

FIG. 1 shows views for illustrating the molecular structures of the stimulus-responsive compound according to the first embodiment before and after an oxidation-reduction reaction. In FIG. 1, each of the open circles and open squares indicates a functional group (atomic group), and each line indicates a bond.

The stimulus-responsive compound of the invention is a compound which has a function of deforming (displacing) the molecular conformation by stimulation, in other words, a function of expanding and contracting the molecular chain.

As shown in FIG. 1(a), the stimulus-responsive compound of this embodiment includes a pair of polysiloxane chains, a cross-linking moiety which cross-links these polysiloxane chains, and a liquid crystal moiety which is bonded to the polysiloxane chain. In the drawing, one cross-linking moiety and one liquid crystal moiety are shown for the sake of making the explanation easier to understand, however, in fact, a plurality of cross-linking moieties and a plurality of liquid crystal moieties are present.

As shown in FIG. 1(a), the cross-linking moiety includes a unit A which has a bond functioning as a rotation axis, and also has a first group ($A_1$ in the drawing) located at one end of the bond and a second group ($A_2$ in the drawing) located at the other end of the bond, a first unit B ($B_1$ in the drawing) which is disposed at a first bonding site of the first group, a second unit B ($B_2$ in the drawing) which is disposed at a first bonding site of the second group, a first unit C ($C_1$ in the drawing), and a second unit C ($C_2$ in the drawing).

The unit A has a bond functioning as a rotation axis, and also has a first group and a second group located at both ends of the bond, respectively. The unit A can rotate by using the bond as an axis. Because of having such a unit, the stimulus-responsive compound can be deformed (displaced).

As the unit A, for example, a group in which two aromatic rings are bonded to each other can be used, however, in particular, one type of group selected from the group consisting of the following formulae (1) to (3) is preferred. By using such a group as the unit A, the stimulus-responsive compound can be deformed (displaced) more smoothly, and therefore is driven at a lower voltage.

[Chem. 3]

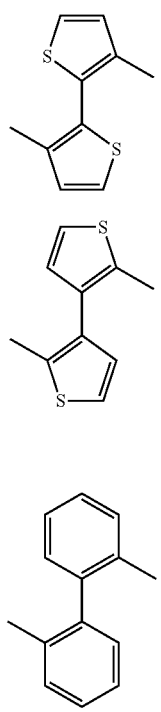

(1)

(2)

(3)

As shown in FIG. 1(a), the first unit B is bonded to the first bonding site of the first group of the unit A. Further, as shown in FIG. 1(a), the second unit B is bonded to the first bonding site of the second group of the unit A.

The first unit B and the second unit B are groups which form a bond between the units B according to an oxidation-reduction reaction (see FIG. 1 (b)). In other words, the units B are groups which form a bond by receiving an electron from the outside (by being reduced), and also are groups which dissociate the bond by releasing an electron to the outside (by being oxidized).

The units B (the first unit B and the second unit B) are not particularly limited as long as the units B (the first unit B and the second unit B) are groups which form a bond between the units B by a reduction reaction. However, the units B (the first unit B and the second unit B) are preferably groups represented by the following formula (4). According to this, by adjusting the reaction conditions, the state of bonding between the units B can be reversibly and more easily switched from the bonding state (a reduction reaction) to the non-bonding state (an oxidation reaction). Further, due to high reactivity, the stimulus-responsive compound can be deformed more smoothly at a low voltage.

[Chem. 4]

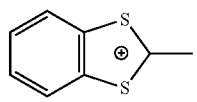

(4)

The units C (the first unit C and the second unit C) are units, each of which has a function of connecting the unit A and the unit B to the polysiloxane chain.

In this embodiment, as shown in FIG. 1, the first unit C is bonded to the second bonding site of the first group of the unit A, and the second unit C is bonded to the second bonding site of the second group of the unit A. According to this configuration, the stimulus-responsive compound can be favorably deformed at a lower voltage.

Further, the first unit C is bonded to one of the pair of polysiloxane chains as shown in FIG. 1. Further, the second unit C is bonded to the other of the pair of polysiloxane chains as shown in FIG. 1.

The first unit C and the second unit C are not particularly limited as long as they have a function of connecting the unit A and the unit B to the polysiloxane chain, but are preferably units having an alkylene group, and more preferably units having an alkylene group having 4 or more and 10 or less carbon atoms. According to this, the stimulus-responsive compound can be favorably deformed at a lower voltage, and also the flexibility of the stimulus-responsive compound (and a deformable material using the same) can be further enhanced.

In the stimulus-responsive compound of this embodiment, the cross-linking moiety as described above cross-links a pair of polysiloxane chains. Since the stimulus-responsive compound has polysiloxane chains, the glass transition temperature of the stimulus-responsive compound can be relatively decreased. As a result, the stimulus-responsive compound can have particularly excellent flexibility and moldability at normal temperature. Further, excellent responsiveness at a low temperature can be achieved.

Examples of the polysiloxane constituting the polysiloxane chain include polydimethylsiloxane, polymethylpropylsiloxane, polydipropylsiloxane, polymethyloctylsiloxane, polydioctylsiloxane, polymethylphenylsiloxane, and polydiphenylsiloxane, and among these, one type or two or more types in combination can be used.

The liquid crystal moiety is bonded to the polysiloxane chain as shown in FIG. 1(a), and also includes a functional group having liquid crystallinity (hereinafter also referred to as "liquid crystalline functional group"). This liquid crystalline functional group exhibits a given orientation by using a technique for orienting liquid crystals. Therefore, the stimulus-responsive compound has a given directionality with respect to the driving.

Further, by directly bonding the liquid crystal moiety to the polysiloxane chain, that is, by providing the liquid crystal moiety and the cross-linking moiety in a single molecule, the occurrence of separation of the components or the like is prevented, and thus, the stability of the stimulus-responsive compound as a whole is enhanced as compared with the case where a molecule including such a liquid crystal moiety is added separately.

The liquid crystalline functional group is not particularly limited as long as it is a group having liquid crystallinity, and examples thereof include a group having a plurality of ring structures such as a group in which a plurality of phenyl groups are linked to one another through an ester group, and a group in which benzene rings or cyclohexane rings are directly linked to one another.

As the liquid crystalline functional group, it is particularly preferred to use a group in which one or more halogen atoms are bonded to one of the plurality of ring structures. According to this, the motion performance when the liquid crystalline functional groups are oriented can be further enhanced, and therefore, the speed of transition to the oriented state is further increased. As a result, the stimulus-responsive compound can be deformed (displaced) more rapidly and smoothly, and thus can be driven at a lower voltage.

Specific examples of the liquid crystalline functional group can include the following groups.

[Chem 5.]

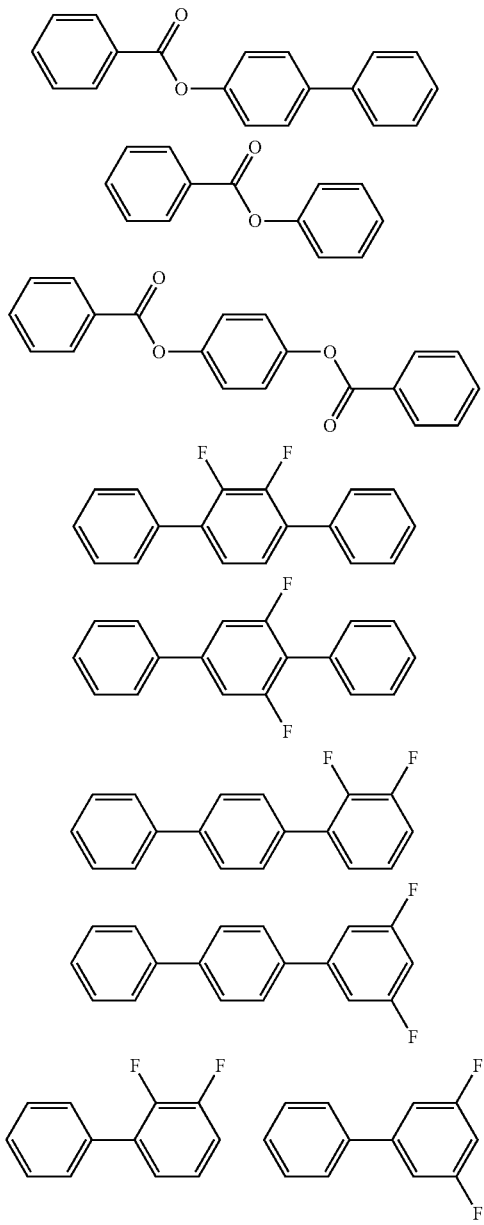

(5)

-continued

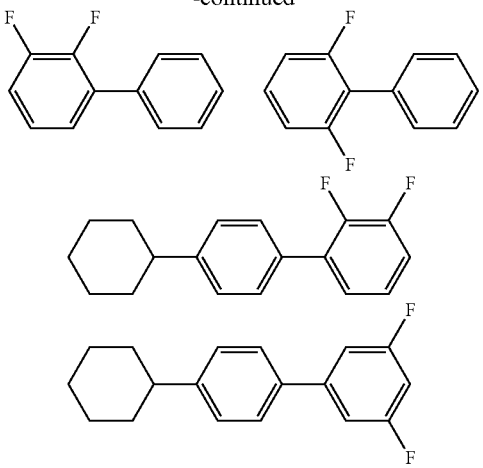

The liquid crystal moiety may be a moiety in which the above-described liquid crystalline functional group is directly bonded to the above-described polysiloxane chain, but is preferably a moiety in which an alkylene group is contained and the liquid crystalline functional group is bonded to the polysiloxane chain through the alkylene group. According to this, the stimulus-responsive compound can be favorably deformed at a lower voltage, and also the flexibility of the stimulus-responsive compound (and a deformable material using the same) can be further enhanced.

The alkylene group is preferably an alkylene group having 4 or more and 10 or less carbon atoms. According to this, the flexibility of the stimulus-responsive compound (and a deformable material using the same) can be further enhanced.

The weight average molecular weight of such a stimulus-responsive compound is preferably 1000 or more and 100000 or less. According to this, the stimulus-responsive compound can be favorably deformed at a lower voltage, and also the flexibility of the stimulus-responsive compound (and a deformable material using the same) can be further enhanced.

As described above, the stimulus-responsive compound of the invention has a characteristic in that it includes a pair of polysiloxane chains, a cross-linking moiety including a unit A which can be axially rotated as described above, units B (a first unit B and a second unit B) which can form a bond between the units by a reduction reaction, and units C, and the above-described liquid crystal moiety. According to this, the stimulus-responsive compound can be deformed (displaced) at a low electric power. Further, by bonding the polysiloxane chain to each unit, the degree of displacement can be relatively increased. Further, the stimulus-responsive compound has a liquid crystal moiety which is bonded to the polysiloxane chain, and this liquid crystal moiety exhibits a given orientation by using a technique for orienting liquid crystals, and therefore, the stimulus-responsive compound has a given directionality with respect to the driving. Further, the stimulus-responsive compound can have particularly excellent flexibility and moldability at normal temperature. Further, because of having polysiloxane chains, the glass transition point can be relatively decreased so that excellent responsiveness at a low temperature can be achieved. Further, the change in the conformation of the stimulus-responsive compound according to an oxidation-reduction reaction is reversible, and displacement from a contracted state to an extended (expanded) state and displacement from an extended (expanded) state to a contracted state can be repeated, and therefore, the stimulus-responsive compound has also excellent reproducibility.

Specific examples of the stimulus-responsive compound according to this embodiment include a compound represented by the following formula (10) (in a reduced state and an oxidized state). By using such a compound, deformation (displacement) can be achieved at a lower electric power, and also the degree of displacement can be relatively increased. Moreover, further excellent flexibility and moldability at normal temperature (low temperature) can be achieved.

[Chem. 6]

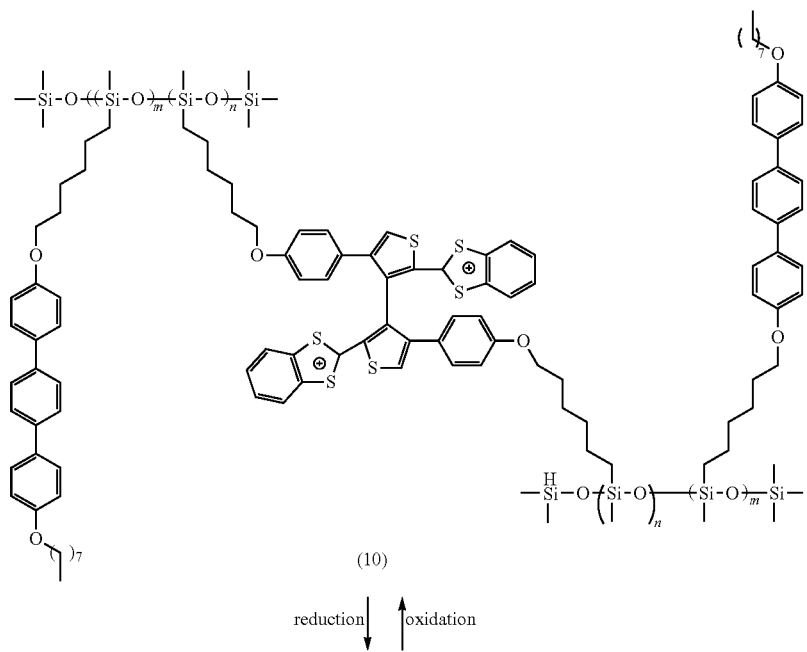

(10)

reduction ↓ ↑ oxidation

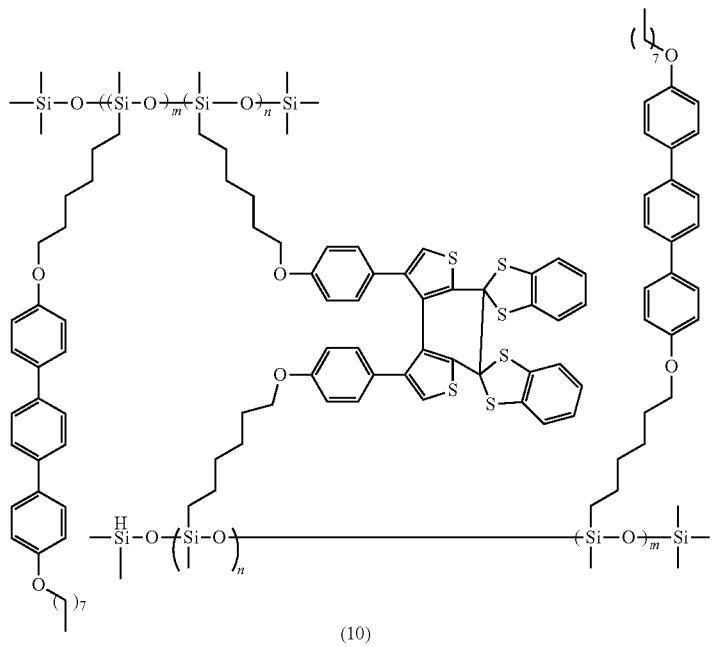

(10)

Second Embodiment of Stimulus-Responsive Compound

Next, a second embodiment of the stimulus-responsive compound of the invention will be described in detail.

Figure 2A:
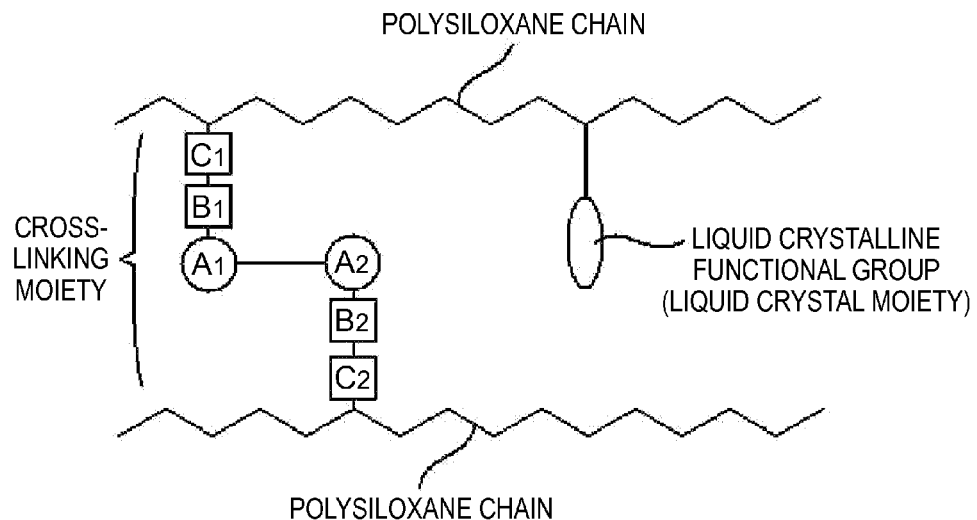
FIG. 2 shows views for illustrating the molecular structures of a stimulus-responsive compound according to a second embodiment before and after an oxidation-reduction reaction.
Figure 2B:
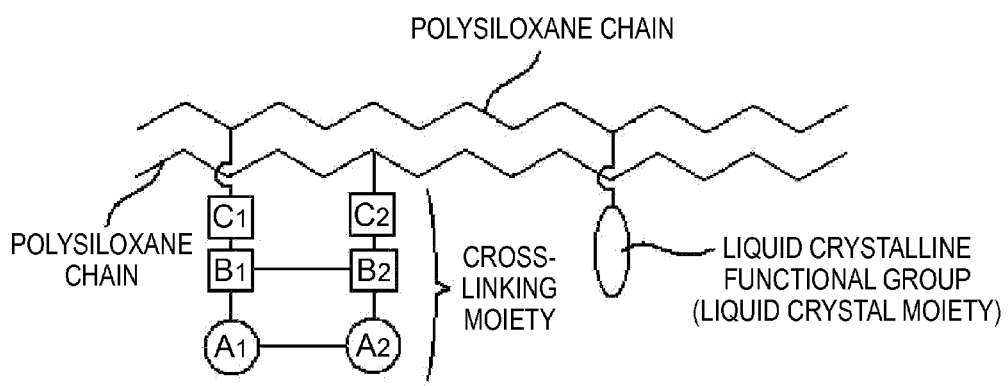

FIG. 2 shows views for illustrating the molecular structures of the stimulus-responsive compound according to the second embodiment before and after an oxidation-reduction reaction. In FIG. 2, each of the open circles and open squares indicates a functional group (atomic group), and each line indicates a bond.

Hereinafter, the second embodiment will be described, however, different points from the above-described embodiment will be mainly described, and the description of the same matter will be omitted. Incidentally, the same components as those in the above-described embodiment will be provided with the same reference numerals.

As shown in FIG. 2(a), the stimulus-responsive compound of this embodiment includes a pair of polysiloxane chains, a cross-linking moiety which cross-links these polysiloxane chains, and a liquid crystal moiety which is bonded to the polysiloxane chain.

The polysiloxane chain and the liquid crystal moiety are the same as those in the first embodiment described above, and therefore, the description thereof will be omitted.

In the same manner as the first embodiment described above, the cross-linking moiety includes a unit A which has a bond functioning as a rotation axis, and also has a first group ($A_1$ in the drawing) located at one end of the bond and a second group ($A_2$ in the drawing) located at the other end of the bond, a first unit B ($B_1$ in the drawing) which is disposed at a first bonding site of the first group, a second unit B ($B_2$ in the drawing) which is disposed at a first bonding site of the second group, a first unit C ($C_1$ in the drawing), and a second unit C ($C_2$ in the drawing).

In this embodiment, as shown in FIG. 2, the first unit C is bonded to the first unit B, and the second unit C is bonded to the second unit B. This point is different from the first embodiment described above. According to this configuration, the displacement amount can be further increased while maintaining the deformability at a low voltage.

Specific examples of the stimulus-responsive compound according to this embodiment include a compound represented by the following formula (21) (in a reduced state) and a compound represented by the following formula (22) (in a reduced state). By using such a compound, deformation (displacement) can be achieved at a lower electric power, and also the degree of displacement can be further increased.

[Chem. 7]

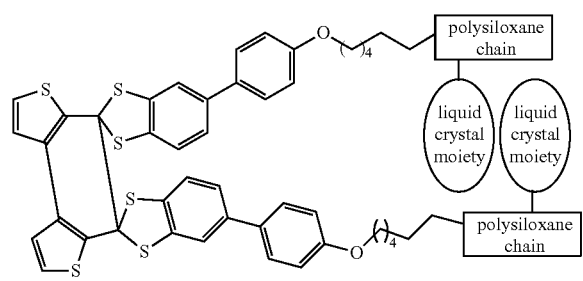

(21)

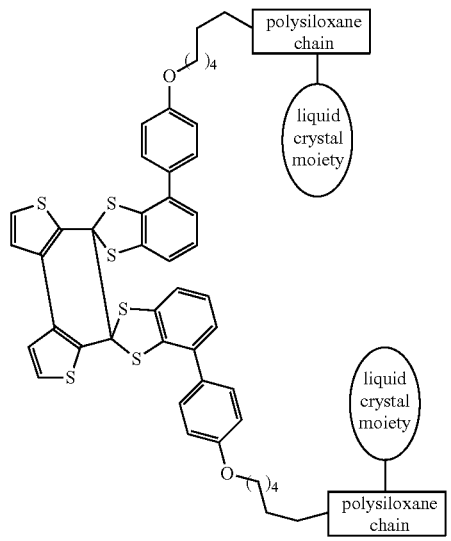

(22)

Deformable Material

Next, a preferred embodiment of a deformable material using the stimulus-responsive compound of the invention described above will be described in detail.

The deformable material includes the stimulus-responsive compound as described above. According to this, the deformable material can be deformed (displaced) at a low electric power, and also the degree of displacement (deformation) can be increased. Further, because of having a liquid crystalline functional group, the deformation directionality of the deformable material can be adjusted. As a result, a larger and directional deformation (displacement) can be caused. Further, particularly excellent flexibility and moldability at normal temperature can be achieved. Further, excellent responsiveness at a low temperature is also achieved. Further, by stopping the application of a voltage, the shape of the deformable material can be maintained. Therefore, such a deformable material can be favorably used for producing an excellent actuator.

The deformable material may contain a component other than the stimulus-responsive compound of the invention.

Electronically Conductive Substance

The deformable material preferably contains, in addition to the stimulus-responsive compound as described above and a polymeric material, an electronically conductive substance which has a function of efficiently transporting electrons in the deformable material. According to this, the deformation (displacement) can be achieved at a lower electric power.

Examples of the electronically conductive substance include metal materials, carbon materials, compounds thereof, and organic materials. Specific examples thereof include a variety of carbon materials such as graphite, carbon nanotubes, graphen, carbon nanoparticles, acetylene black, and active carbon; electrically conductive polymers such as polyaniline, polythiol, polypyrrole, Si-based semiconductor materials, Ga-based semiconductor materials, and PEDOT: PSS (3,4-polyethylenedioxythiophene-polystyrene-sulfonate); transparent electrically conductive oxide materials (for example, ITO (indium tin oxide), etc.); and a variety of metal nanowires. Among these, particularly carbon materials are preferred, and carbon nanoparticles are more preferred. According to this, high electronic conductivity can be imparted to the whole deformable material.

The form of the particle of the carbon material or the like is not particularly limited, and the particle may be in any form such as a dense, porous, or hollow form. Further, for example, in the case where carbon nanoparticles are used as the electronically conductive substance, it is preferred to use carbon nanoparticles having a hollow shell structure. Since electrons are transported only in a surface portion of the particle, by using carbon nanoparticles having a hollow shell structure, the function of transporting electrons can be further improved. Further, the whole deformable material can be largely displaced at a relatively low voltage.

In the case where carbon nanoparticles having a hollow shell structure are used as the electronically conductive substance, the porosity (void ratio) of the carbon nanoparticles is preferably 90% by volume or less, more preferably 30% by volume or more and 90% by volume or less, further more preferably 60% by volume or more and 80% by volume or less. According to this, the effect as described above can be more prominently exhibited while sufficiently maintaining the shape stability of the carbon nanoparticles (electronically conductive substance). As a result, the effect as described above can be exhibited stably over a long period of time, and also the uniformity of the properties of the deformable materials among lots, and the uniformity of the properties among individual products in the case where the deformable material is applied to an actuator or the like can be particularly enhanced.

The electronically conductive substance may be dissolved in the other component in the deformable material, but preferably exists as an insoluble component in the deformable material, and particularly more preferably exists in the form of a solid.

Examples of the form of the electronically conductive substance include various forms such as a particle, a plate, and a fiber (for example, a tube), but the electronically conductive substance is particularly preferably in the form of a particle. The shape of the particle may be either a sphere or a non-sphere (for example, a scale, a spindle, or a spheroid). According to this, the electronically conductive substance can be dispersed uniformly in the whole deformable material, and the whole deformable material can be largely displaced uniformly at a relatively low voltage.

In the case where the electronically conductive substance is in the form of a particle, the average particle diameter thereof is preferably 1 nm or more and 10 µm or less, more preferably 2 nm or more and 90 nm or less. According to this, by providing a necessary concentration of the electronically conductive material in the whole deformable material, supply of electrons can be reliably achieved in the deformable material. Further, the efficiency of supply of electrons to the stimulus-responsive compound can be particularly enhanced, and a larger displacement force and displacement amount can be obtained. On the other hand, if the average particle diameter thereof is less than the above-described lower limit, the electronically conductive material is aggregated, and therefore, additionally, a treatment for preventing this aggregation is needed. Meanwhile, if the average particle diameter thereof exceeds the above-described upper limit, it is necessary to increase the content of the electronically conductive material, and a further improvement of the effect as described above is not observed.

The "average particle diameter" as used herein refers to an average particle diameter on the volume basis (volume average particle diameter ($D_{50}$)). Examples of the measurement device include a laser diffraction scattering particle size analyzer, Microtrack MT-3000 (manufactured by Nikkiso Co., Ltd.). The volume average particle diameters ($D_{50}$) in the below-described Examples are values measured by the above-described Microtrack MT-3000.

By the incorporation of the electronically conductive material as described above, the whole deformable material can be largely displaced at a lower voltage. Further, the whole deformable material can be efficiently deformed. As a result, for example, when the deformable material is applied to an actuator, a sufficiently large displacement force and displacement amount can be obtained at a lower voltage. Further, in the case where an actuator is produced by using the deformable material of the invention, even if an electrode is not brought into contact with a large area of the deformable material (deformable material layer), the deformable material (deformable material layer) can be sufficiently largely displaced. As a result, the actuator can operate flexibly.

The content of the electronically conductive substance in the deformable material is preferably 10% by mass or more and 90% by mass or less, more preferably 30% by mass or more and 70% by mass or less. According to this, electrons in the deformable material can be favorably transported. On the other hand, if the content of the electronically conductive substance is less than the above-described lower limit, the function of assisting the transfer of electrons in the deformable material is decreased. Meanwhile, if the content of the electronically conductive substance exceeds the above-described upper limit, a further improvement of the effect as described above is not observed.

The dispersion state of the electronically conductive substance in the deformable material is preferably uniform, however, the deformable material may have a portion in which the concentration of the electronically conductive material may continuously or discontinuously (intermittently) change. In the case where the dispersion state of the electronically conductive substance in the deformable material is uniform, the whole deformable material can be largely displaced uniformly at a relatively low voltage. In particular, even if the thickness of the deformable material is relatively large, the deformable material can be efficiently deformed.

Other Component

The deformable material may contain a solvent. When the solvent is incorporated in the above-described stimulus-responsive compound or the like, the deformable material is favorably gelled, and therefore, solidification can be easily achieved, and also the handleability of the deformable material can be improved.

Examples of the solvent include organic solvents such as dimethyl sulfoxide (DMSO), toluene, benzene, dimethylformamide (DMF), dimethylacetamide (DMA), chloroform, dichloromethane, dichloroethane, acetone, propylene carbonate, methylpentanone, ethylpentanone, and acetonitrile.

The content of the solvent in the deformable material is preferably 20% by mass or more and 80% by mass or less, more preferably 30% by mass or more and 60% by mass or less. According to this, the handleability of the deformable material can be further improved.

The deformable material may contain an electrolyte.

As the electrolyte, any of a variety of acids, bases, and salts can be used, however, it is preferred to use a salt. According to this, the durability of the deformable material can be particularly enhanced. As the electrolyte salt, for example, an inorganic salt such as lithium perchlorate, lithium trifluoromethanesulfonate, or lithium hexafluorophosphate; an organic salt such as tetrabutylammonium tetrafluoroborate, 1-butyl-1-methylpyrrolidinium bis(trifluoromethylsulfonyl) imide (BMPTFSI), methyltrioctylammonium bis(trifluoromethylsulfonyl)imide (MTOATFSI), triethylsulfonium bis(trifluoromethylsulfonyl)imide (TESTFSI), or 1-ethyl-3-methylimidazolium trifluoromethanesulfonate (EMICF$_3$SO$_3$); or the like can be used. The structural formulae of BMPTFSI, MTOATFSI, TESTFSI, and EMICF$_3$SO$_3$ are represented by the following formula (12), the following formula (13), the following formula (14), and the following formula (15), respectively.

[Chem. 8]

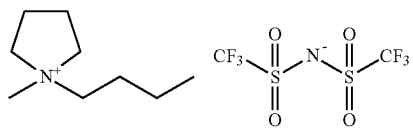

(12)

[Chem. 9]

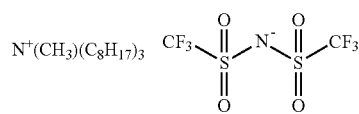

(13)

[Chem. 10]

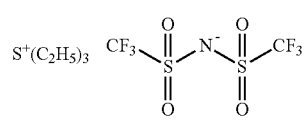

(14)

[Chem. 11]

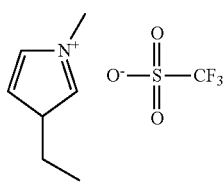

(15)

It is preferred that the deformable material contains one member or two or more members selected from the group consisting of lithium perchlorate, lithium trifluoromethanesulfonate, lithium hexafluorophosphate, and tetrabutylammonium tetrafluoroborate as the electrolyte among these compounds. According to this, the response speed of the stimulus-responsive compound (deformable material) can be more effectively increased, and also the displacement of the whole deformable material accompanying the expansion and contraction of the stimulus-responsive compound can be further amplified.

By the incorporation of the electrolyte as described above, charge transfer to and from the stimulus-responsive compound can be allowed to more rapidly proceed, and therefore, the high-speed responsiveness of the deformable material can be particularly enhanced. In addition, in an actuator as described below, the stimulus-responsive compound constituting the deformable material layer can be efficiently expanded and contracted throughout the whole deformable material layer (in particular, the whole deformable material layer in the thickness direction). As a result, the ratio of expansion and contraction of the deformable material layer as a whole can be particularly increased.

In particular, in the case where the deformable material contains an electrolyte along with a solvent, the response speed of the stimulus-responsive compound (deformable material) can be more effectively improved, and also the displacement of the whole deformable material accompanying the expansion and contraction of the stimulus-responsive compound can be further amplified.

The content of the electrolyte in the deformable material is preferably 3% by mass or more and 80% by mass or less, more preferably 5% by mass or more and 30% by mass or less. According to this, the effect as described above is more prominently exhibited.

The deformable material may contain a component other than the above-described components.

The electrical conductivity of the deformable material is preferably 0.1 S/cm or more, more preferably 1 S/cm or more. According to this, the deformable material can be favorably applied to an actuator as described in detail below, and further, the size of the actuator can be reduced.

As described above, the deformable material of this embodiment includes a stimulus-responsive compound which changes its molecular structure according to an oxidation-reduction reaction, a polymeric material, and an electronically conductive substance. According to this, the whole deformable material can be largely displaced at a relatively low voltage. In particular, even if the thickness of the deformable material is relatively large, the whole deformable material can be efficiently deformed. As a result, for example, in the case where the deformable material is applied to an actuator, a sufficiently large displacement force and displacement amount can be obtained at a low voltage. Further, the response speed of the deformable material can be increased. Further, it is possible to reduce the weight of the deformable material and the weight of the actuator produced by using the deformable material. Further, since the deformable material as a whole can be formed into a solid or a gel, the handleability (ease of handling) of the deformable material is enhanced, and also the range of application of the deformable material can be expanded. Further, since the deformable material as a whole can be formed into a gel, it can be favorably used for producing an actuator which operates flexibly.

Actuator

Next, an actuator using the above-described deformable material (the deformable material containing the above-described stimulus-responsive compound and electronically conductive substance) will be described in detail.

Figure 3:
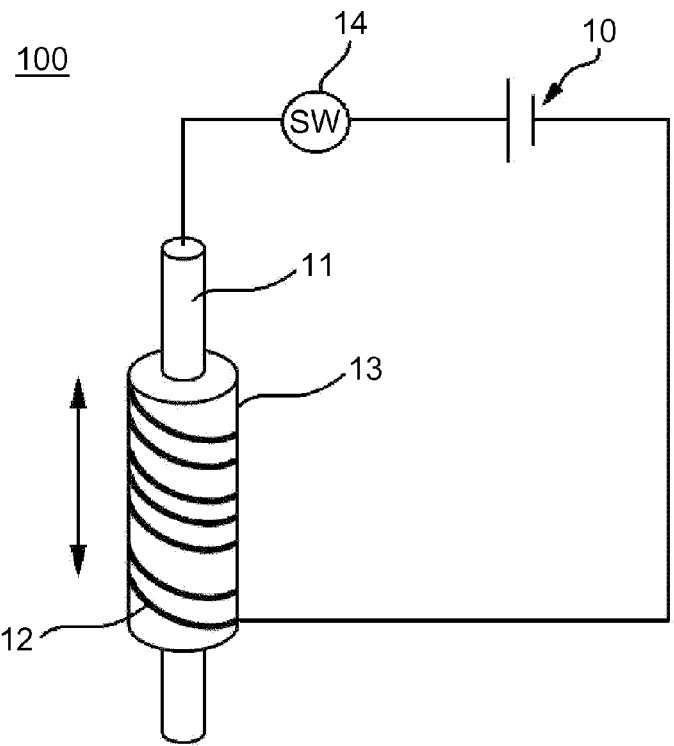
FIG. 3 is a schematic view showing one example of an actuator using a deformable material.

FIG. 3 is a schematic view showing one example of an actuator using the above-described deformable material.

The actuator of the invention is produced by using the above-described deformable material. According to this, an actuator which can be largely displaced at a low voltage and has excellent responsiveness at a low temperature can be provided.

In particular, as shown in FIG. 3, an actuator 100 of this embodiment is formed by using a switch 14 which turns on and off a power source 10 and the deformable material, and includes a deformable material layer 11 which is connected to the power source 10, a counter electrode 12 which is connected to the power source 10, an electrolyte layer 13 which is interposed between the deformable material layer 11 and the counter electrode 12.

The deformable material layer 11 is a member constituted by the above-described deformable material, and is a layer which can be deformed in such a manner that it is expanded or contracted according to an oxidation-reduction reaction. In this embodiment, the deformable material layer 11 has a cylindrical shape. Further, in the structure shown in the drawing, the deformable material layer 11 is connected to the positive electrode of the power source 10.

The electrolyte layer 13 is constituted by a material containing an electrolyte, and is provided so as to cover the outer peripheral surface of the cylindrical deformable material layer 11 as shown in FIG. 3. This electrolyte layer 13 is a layer provided for generating an electric potential difference between the electrodes, and also is a layer for preventing the generation of an electric potential difference in the deformable material layer 11. Accordingly, electric potential distribution in the deformable material layer 11 does not occur.

As the electrolyte, for example, an inorganic salt such as copper perchlorate, lithium perchlorate, or lithium trifluoromethanesulfonate, an organic salt such as tetrabutylammonium tetrafluoroborate, or the like can be used.

The electrolyte layer 13 may contain a polymeric material such as polyacrylonitrile or polyethylene oxide. According to this, the electrolyte layer 13 can be easily formed.

The electrolyte layer 13 may contain a solvent such as propylene carbonate or ethylene carbonate. According to this, the electrolyte layer 13 can be easily formed.

The counter electrode 12 is provided on the outer peripheral surface of the electrolyte layer 13, and is connected to the negative electrode of the power source 10 in this embodiment.

The counter electrode 12 is constituted by a material having electrical conductivity. Examples of the constituent material of the counter electrode 12 include metal materials (including alloys) such as Pt, Al, Cu, and Fe.

The power source 10 is a direct current power source, and in a state shown in FIG. 3, the deformable material layer 11 is connected to the positive electrode of the power source 10 through the switch 14, and the counter electrode 12 is connected to the negative electrode of the power source 10. In the case where the stimulus-responsive compound constituting the deformable material layer 11 has a structure as shown in FIG. 1 or 2, when the switch 14 is turned on, an electric current flows between the deformable material layer 11 and the counter electrode 12, and the stimulus-responsive compound is transformed into a state where the molecular chain is extended (expanded) by an oxidation reaction. As a result, also the deformable material layer 11 as a whole is transformed into a state where it is extended (expanded) in the directions indicated by the arrows in the drawing.

On the other hand, when the switch 14 is turned on in a state where the positive electrode and the negative electrode of the power source 10 are reversed, an electric current flows between the deformable material layer 11 and the counter electrode 12, and the stimulus-responsive compound is transformed into a state where the molecular chain is contracted by a reduction reaction. As a result, also the deformable material layer 11 as a whole is transformed into a state where it is contracted in the opposite directions indicated by the arrows in the drawing.

As described above, the deformable material can be expanded and contracted a plurality of times by repeating extension (expansion) and contraction, and also the reproducibility of the expansion and contraction is excellent. Accordingly, the actuator of this embodiment can adopt not only the direct current structure as described above, but also an alternating current structure, and can be repeatedly expanded and contracted.

According to this, an actuator which can be largely displaced at a low voltage can be provided, and also the deformable material layer 11 constituted by the deformable material can be made to operate more flexibly.

Hereinabove, preferred embodiments of the invention are described, however, the invention is not limited thereto.

For example, in the above-described embodiments, a case where the stimulus-responsive compound contains the unit A, the first unit B, the second unit B, the first unit C, and the second unit C is mainly described. However, in the invention, the stimulus-responsive compound may be any as long as the compound changes its molecular structure according to an oxidation-reduction reaction, and the stimulus-responsive compound is not limited to those having all of the above-described respective units.

Further, the actuator of the invention may be any as long as it is produced by using the deformable material of the invention, and is not limited to those having a structure shown in FIG. 3.

EXAMPLES

Hereinafter, the invention will be described in more detail with reference to Examples, however, the invention is not limited only to these Examples.

Example

[1] Production of Stimulus-Responsive Compound 2,2'-Diformyl-4,4'-dibromobithienyl and 1-bromo-4-tert-butyldimethylsilyloxybenzene were coupled to each other in the presence of a palladium catalyst, and the resulting compound was reacted with 1-bromo-6-hexene in the presence of potassium carbonate, whereby a vinyl group was introduced into its terminal end.

Subsequently, the resulting compound was reacted with benzene dithiol in the presence of an acid catalyst, and further subjected to an oxidation reaction with $(p-BrC_6H_4)_3NSbCl_6$ and a reduction reaction with zinc, whereby a stimulus-responsive moiety was obtained.

On the other hand, 4-hydroxy-1-bromobiphenyl and 1-bromooctane were reacted with each other in the presence of potassium carbonate, whereby a compound A was obtained.

Subsequently, the compound A and tert-butyldimethylsilyloxyphenylboronic acid were coupled to each other in the presence of a palladium catalyst, whereby a compound B was obtained.

Subsequently, the compound B was reacted with 1-bromo-6-hexene so as to introduce a vinyl group into its terminal end, whereby a liquid crystal moiety was obtained. The above-prepared stimulus-responsive moiety and liquid crystal moiety, and a polysiloxane were reacted with one another in the presence of a platinum catalyst, whereby a stimulus-responsive compound represented by the following formula (10) was obtained.

[Chem. 12]

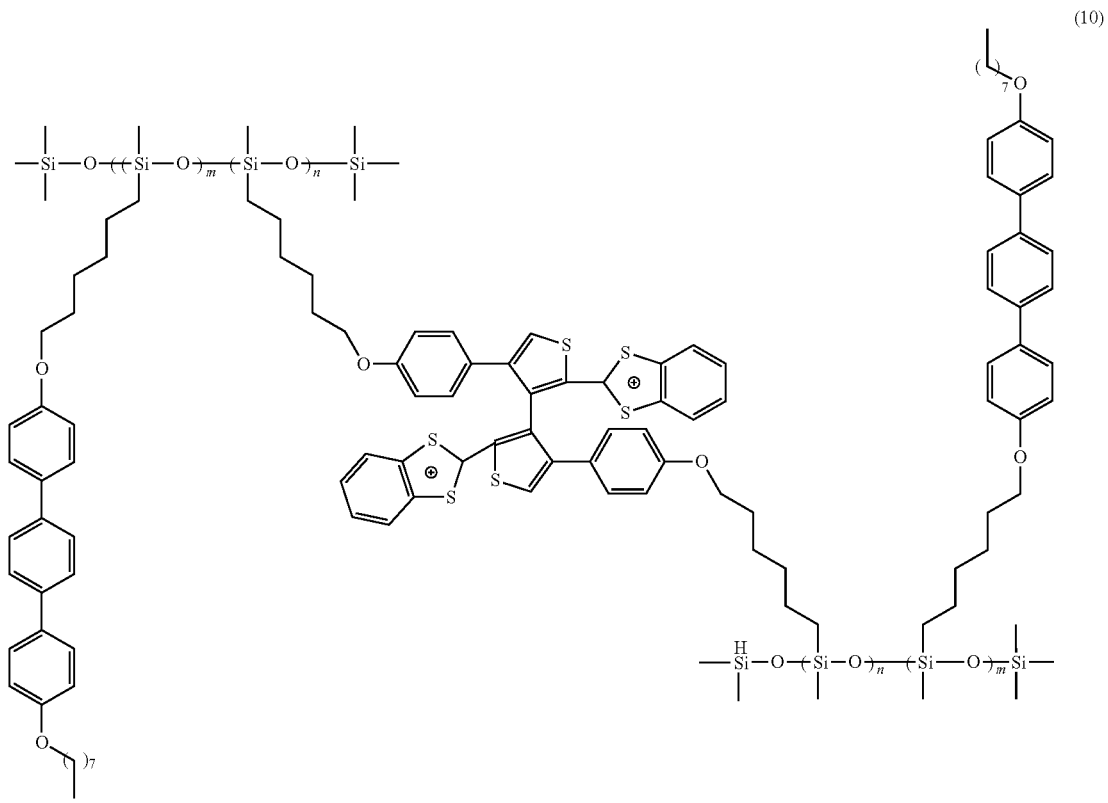

[2] Production of Deformable Material

The stimulus-responsive compound obtained as described above and carbon nanoparticles (Ketchen Black EC300J, manufactured by Lion Corporation) having an average particle diameter of 39.5 nm and a porosity of 60% by volume as a porous body having interconnected pores were mixed at 50:50 (weight ratio), whereby a deformable material in the form of a gel was obtained.

[3] Production of Actuator

By using the deformable material obtained as described above, an actuator as shown in FIG. 3 was produced.

The deformable material obtained as described above was molded into a cylindrical shape having a length of 20 cm and a diameter of 0.3 cm, and the resulting material was used as a deformable material layer.

Subsequently, by using a material for forming an electrolyte layer obtained by mixing propylene carbonate, ethylene carbonate, polyacrylonitrile, and copper perchlorate at a molar ratio of 38:38:13:11, an electrolyte layer having a thickness of 0.1 cm was formed on the periphery of the deformable material layer.

Subsequently, as shown in FIG. 3, a platinum electrode wire was wound around the electrolyte layer to form a counter electrode, whereby an actuator was obtained.

Comparative Example

An actuator was produced in the same manner as in the above-described Example except that the deformable material layer was produced as follows.

25 mg of a single-walled carbon nanotube ("HiPco", manufactured by Carbon Nanotechnology Incorporated, Fe content: 14% by weight) (hereinafter also referred to as "SWNT"), 25 mL of a 5 wt % Nafion solution (manufactured by Aldrich Co., Ltd., a mixed solvent containing a low molecular weight straight-chain alcohol and water (10%)), and 25 mL of methanol (a special grade reagent) were weighed and mixed in a beaker, followed by ultrasonic irradiation for 10 hours or more in an ultrasonic cleaner, whereby a mixed dispersion of SWNT and Nafion was prepared. This dispersion was casted on a glass plate, which was then left in a fume hood as such for at least a full day and night to remove the solvent. After the solvent was removed, a heat treatment was performed at 150° C. for 4 hours. A formed complex film of SWNT and Nafion was peeled off from the plate, and then, molded into a cylindrical shape having a length of 20 cm and a diameter of 0.3 cm, and the resulting material was used as a deformable material layer.

Evaluation of Responsiveness

Figure 4:
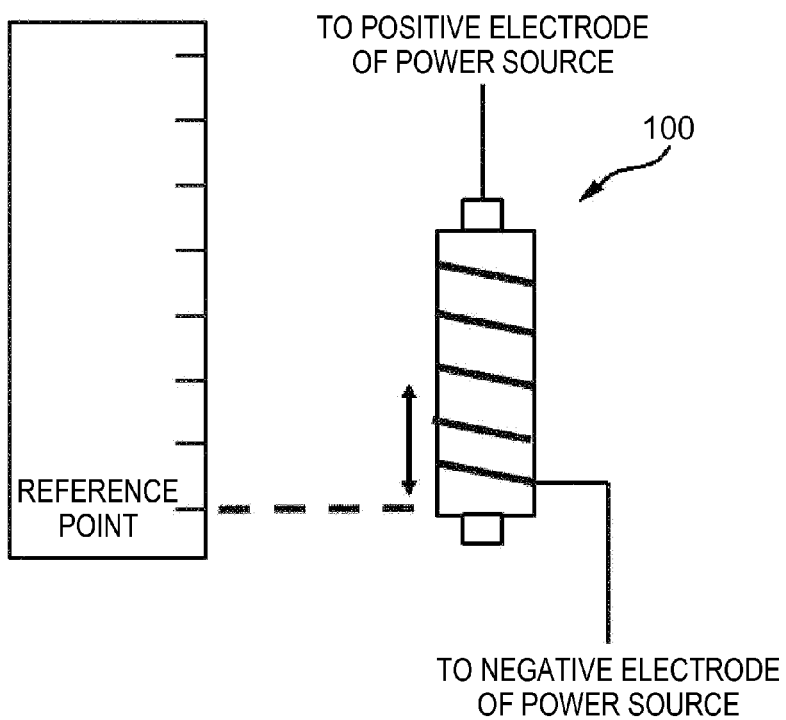
FIG. 4 is a view for illustrating a method for evaluating an actuator using a deformable material.

Each of the actuators of Example and Comparative Example was vertically fixed and connected to the electrodes as shown in FIG. 4. In an environment at 25° C., the displacement of the length of the actuator after a voltage was applied from a state where a voltage was not applied was determined by measuring the degree of deviation from the reference point in FIG. 4 using a laser displacement meter.

As a result, the actuator using the stimulus-responsive compound of the invention was largely displaced at a relatively low voltage, however, in the case of the actuator of Comparative Example, the degree of displacement was small.

Further, when the same test as described above was performed in an environment at −10° C. and −25° C., the same results were obtained.

REFERENCE SIGNS LIST

A: unit A, B: unit B, C: unit C, 100: actuator, 10: power source, 11: deformable material layer, 12: counter electrode, 13: electrolyte layer, 14: switch

The invention claimed is:

1. A stimulus-responsive compound, comprising:
a pair of polysiloxane chains;
a cross-linking moiety which cross-links the pair of polysiloxane chains; and
a liquid crystal moiety which is bonded to at least one of the pair of polysiloxane chains and includes a functional group having liquid crystallinity, wherein
the cross-linking moiety includes:
a unit A which has a bond functioning as a rotation axis, and also has a first group located at one end of the bond and a second group located at the other end of the bond;
a first unit B which is disposed at a first bonding site of the first group;
a second unit B which is disposed at a first bonding site of the second group;
a first unit C; and
a second unit C, and
the first unit C and one of the pair of polysiloxane chains are bonded to each other,
the second unit C and the other of the pair of polysiloxane chains are bonded to each other, and
the first unit B and the second unit B are bonded to each other by a reduction reaction.

2. The stimulus-responsive compound according to claim 1, wherein the unit A is one group selected from the group consisting of the following formula (1), the following formula (2), and the following formula (3):

[Chem. 1]

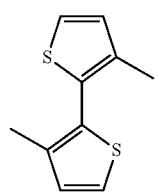 (1)

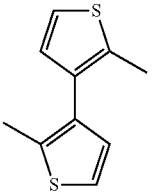 (2)

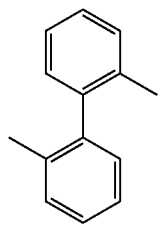 (3)

3. The stimulus-responsive compound according to claim 1, wherein the first unit B and the second unit B are each a group represented by the following formula (4):

[Chem. 2]

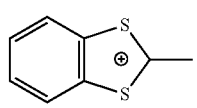 (4)

4. The stimulus-responsive compound according to claim 1, wherein the first unit C and the second unit C each have an alkylene group having 4 or more and 10 or less carbon atoms.

5. The stimulus-responsive compound according to claim 1, wherein the functional group having liquid crystallinity has a plurality of ring structures, and
one or more halogen atoms are bonded to one of the plurality of ring structures.

6. A deformable material comprising the stimulus-responsive compound according to claim 1.

7. The deformable material according to claim 6, wherein an electronically conductive substance is contained.

8. The deformable material according to claim 6, wherein the electronically conductive substance contains a carbon material.

9. The deformable material according to claim 6, wherein the electronically conductive substance is in the form of a particle.

10. The deformable material according to claim 9, wherein the electronically conductive substance has an average particle diameter of 1 nm or more and 10 μm or less.

11. An actuator, wherein the actuator is produced by using the deformable material according to claim 6.

* * * * *